United States Patent
Jeong et al.

(10) Patent No.: US 8,611,726 B2
(45) Date of Patent: Dec. 17, 2013

(54) APPARATUS AND METHOD FOR GENERATING DIGITAL CINEMA CONTENT AND APPARATUS AND METHOD FOR PLAYING DIGITAL CINEMA CONTENT

(75) Inventors: Yeon Jeong Jeong, Daejeon (KR); Kisong Yoon, Daejeon (KR); Jung Soo Lee, Daejeon (KR); Jinwuk Seok, Daejeon (KR); Jeong-Woo Lee, Daejeon (KR); Bumho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 24 days.

(21) Appl. No.: 13/298,844

(22) Filed: Nov. 17, 2011

(65) Prior Publication Data

US 2012/0121236 A1    May 17, 2012

(30) Foreign Application Priority Data

Nov. 17, 2010 (KR) ................. 10-2010-0114541

(51) Int. Cl.
*H04N 9/80* (2006.01)
(52) U.S. Cl.
USPC ........... 386/259; 386/258; 386/252; 386/224; 386/244; 386/257; 386/255; 386/232; 386/248; 382/166; 382/167
(58) Field of Classification Search
USPC ......... 386/224, 252, 244, 259, 257, 255, 232, 386/258, 248
See application file for complete search history.

(56) References Cited

U.S. PATENT DOCUMENTS

| | | | |
|---|---|---|---|
| 7,590,294 B2* | 9/2009 | Fukuhara et al. | 382/232 |
| 8,402,555 B2* | 3/2013 | Grecia | 726/29 |
| 2002/0021843 A1 | 2/2002 | Fukuhara et al. | |
| 2006/0126948 A1 | 6/2006 | Fukuhara et al. | |
| 2006/0245726 A1* | 11/2006 | Mizuno | 386/95 |
| 2009/0144542 A1* | 6/2009 | Wetmore et al. | 713/156 |
| 2009/0172028 A1* | 7/2009 | Benitez et al. | 707/104.1 |
| 2009/0185684 A1* | 7/2009 | Antonellis et al. | 380/210 |
| 2009/0196426 A1 | 8/2009 | Walker et al. | |
| 2012/0314944 A1* | 12/2012 | Ninan et al. | 382/166 |

FOREIGN PATENT DOCUMENTS

| | | |
|---|---|---|
| JP | 4174960 | 8/2008 |
| KR | 1020080074954 | 8/2008 |
| KR | 1020090088705 | 8/2009 |
| KR | 1020100024436 | 3/2010 |
| WO | 2009/002313 A1 | 12/2008 |

* cited by examiner

*Primary Examiner* — Helen Shibru
(74) *Attorney, Agent, or Firm* — Nelson Mullins Riley & Scarborough LLP

(57) ABSTRACT

Provided are an apparatus and method for generating digital cinema content and an apparatus and method for playing digital cinema content. The method of playing digital cinema content using a digital cinema package (DCP) including frame data having a first resolution and length information about frame data having a second resolution lower than the first resolution, and a key delivery message (KDM) includes obtaining a material exchange format (MXF) file and a decryption key by parsing the DCP and the KDM, extracting an encrypted triplet from the MXF file, extracting the length information about the second-resolution frame data using the encrypted triplet and the decryption key, decrypting an amount of data required to decrypt the second-resolution frame data in the first-resolution frame data using the length information about the second-resolution frame data, and decoding the decrypted second-resolution frame data.

8 Claims, 4 Drawing Sheets

APPARATUS AND METHOD FOR GENERATING DIGITAL CINEMA CONTENT AND APPARATUS AND METHOD FOR PLAYING DIGITAL CINEMA CONTENT

CLAIM FOR PRIORITY

This application claims priority to Korean Patent Application No. 10-2010-0114541 filed on Nov. 17, 2010 in the Korean Intellectual Property Office (KIPO), the entire contents of which are hereby incorporated by reference.

BACKGROUND

1. Technical Field

Example embodiments of the present invention relate in general to an apparatus and method for generating digital cinema content and an apparatus and method for playing digital cinema content, and more particularly, to a method of generating and playing digital cinema content capable of playing data to show the digital cinema content by decrypting and decoding only data required for showing the digital cinema content having a resolution of 4K with a resolution of 2K and an apparatus for generating and playing digital cinema content using the method.

2. Related Art

Digital cinema refers to a movie that is filmed by a film camera or a digital camera, processed in the form of a digital file, packaged, distributed through a process medium (hard disk drive (HDD)), a satellite, a broadband access network, etc., and provided to the movie-going public by a digital cinema system of a movie theater through a high quality digital video service.

On July 2005, Digital Cinema Initiatives (DCI), formed by major Hollywood motion picture studios, released the DCI specification, which became a technology standard for distribution/screening of digital movies. Digital cinema content used according to the DCI specification conforms to a standard for compressed moving picture (Wavelet, Moving Picture Experts Group (MPEG)-high definition (HD), or Joint Photographic Experts Group (JPEG)-2000) having a high resolution of 2K (2048*1080) or 4K (4096*2048), and has standards such as a digital cinema package (DCP) for encrypting and safely distributing the content and a key delivery message (KDM) for transferring decryption information.

Digital cinema theaters show digital cinema content using a received DCP and KDM. At this time, the content should be screened in real time with a resolution of 2K and a frame rate of 24 frames per second (fps), with a resolution of 2K and a frame rate of 48 fps, or with a resolution of 4K and a frame rate of 24 fps. Also, digital cinema theaters should be able to show digital cinema content having a resolution of 4K and a frame rate of 24 fps in real time with a resolution of 2K and a frame rate of 24 fps.

4K digital cinema content can be screened with a resolution of 4K or 2K using a DCP obtained by encrypting and packaging various elements, such as images, sound and captions, and a KDM having decryption information required for playing the content. To show digital cinema, a showing server should have a large data processing capability and a real-time processing capability. In other words, a high-performance server is required to decrypt all 4K data and extract 2K data.

As mentioned above, digital cinema compliant with the DCI specification can be played with a resolution of 2K using digital cinema content having a resolution of 4K. However, it is necessary to decrypt the whole encrypted 4K digital cinema content and extract data having a resolution of 2K, so that a showing server can show the content with a resolution of 2K. To extract only the 2K-resolution data from the 4K-resolution data, the end of the 2K-resolution data should be found by parsing JPEG 2000 (J2K) frame data, which may increase a load of the showing server and deteriorate real-time screening.

Consequently, in order to show 4K-resolution digital cinema content compliant with the DCI specification with a resolution of 2K, only 2K-resolution data needs to be extracted from the 4K digital cinema content and decrypted.

SUMMARY

Accordingly, example embodiments of the present invention are provided to substantially obviate one or more problems due to limitations and disadvantages of the related art.

Example embodiments of the present invention provide a method of generating and playing digital cinema content capable of playing data to show the digital cinema content by decrypting and extracting only data required for showing the digital cinema content having a resolution of 4K with a resolution of 2K without an additional process, and an apparatus for generating and playing digital cinema content using the method.

In some example embodiments, a method of generating digital cinema content includes: generating frame data having a first resolution; extracting length information about frame data having a second resolution from the first-resolution frame data; generating and encrypting a triplet including the extracted length information about the second-resolution frame data; generating a material exchange format (MXF) file by performing MXF wrapping on the encrypted triplet; and packaging the MXF file into a digital cinema package (DCP).

In an example embodiment of the present invention, the first-resolution frame data may be 4K-resolution Joint Photographic Experts Group (JPEG) 2000 (J2K) frame data, and the second-resolution frame data may be 2K-resolution J2K frame data.

Generating and encrypting the triplet may include: encrypting the first-resolution frame data using an encryption key; and generating the encrypted triplet using the encrypted first-resolution frame data and the length information about the second-resolution frame data.

The length information about the second-resolution frame data may be inserted into cryptographic information in the encrypted triplet.

In other example embodiments, an apparatus for generating digital cinema content includes: an encoder configured to generate frame data having a first resolution; a triplet generation and encryption unit configured to extract length information about frame data having a second resolution from the first-resolution frame data, and generate and encrypt a triplet including the extracted length information about the second-resolution frame data; an MXF wrapping unit configured to generate an MXF file by performing MXF wrapping on the encrypted triplet; and a packaging unit configured to package the MXF file into a DCP.

The triplet generation and encryption unit may include: a second-resolution length extraction means configured to extract the length information about the second-resolution frame data from the first-resolution frame data; a frame encryption means configured to encrypt the first-resolution frame data using an encryption key; and an encrypted triplet generation means configured to generate the encrypted triplet using the encrypted the first-resolution frame data and the length information about the second-resolution frame data.

The encrypted triplet generation means may insert the length information about the second-resolution frame data into cryptographic information in the encrypted triplet.

In other example embodiments, a method of playing digital cinema content using a DCP including frame data having a first resolution and length information about frame data having a second resolution lower than the first resolution, and a key delivery message (KDM) includes: obtaining an MXF file and a decryption key by parsing the DCP and the KDM; extracting an encrypted triplet from the MXF file; extracting the length information about the second-resolution frame data using the encrypted triplet and the decryption key; decrypting an amount of data required to decrypt the second-resolution frame data in the first-resolution frame data using the length information about the second-resolution frame data; and decoding the decrypted second-resolution frame data.

In other example embodiments, an apparatus for playing digital cinema content using a DCP including frame data having a first resolution and length information about frame data having a second resolution lower than the first resolution, and a KDM includes: an unpackaging unit configured to obtain an MXF file by parsing the DCP; a KDM decryption unit configured to obtain a decryption key by parsing the KDM; an MXF unwrapping unit configured to extract an encrypted triplet from the MXF file; and a triplet decryption unit configured to extract the length information about the second-resolution frame data using the encrypted triplet and the decryption key, and decrypting an amount of data required to decrypt the second-resolution frame data in the first-resolution frame data using the length information about the second-resolution frame data.

The triplet decryption unit may include: a second-resolution data length extraction means configured to extract the length information about the second-resolution frame data from the encrypted triplet; a decryption length extraction means configured to extract a plaintext offset from the encrypted triplet, and calculate an amount of the data to be decrypted by comparing the extracted plaintext offset with the second-resolution data length; and a decryption means configured to decrypt the encrypted triplet according to the calculated decryption amount using the decryption key.

The triplet decryption unit may further include a second frame generation means configured to generate the second-resolution data using the plaintext offset and the decrypted data.

The apparatus for playing digital cinema content may further include a decoder configured to decode the decrypted second-resolution frame data.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
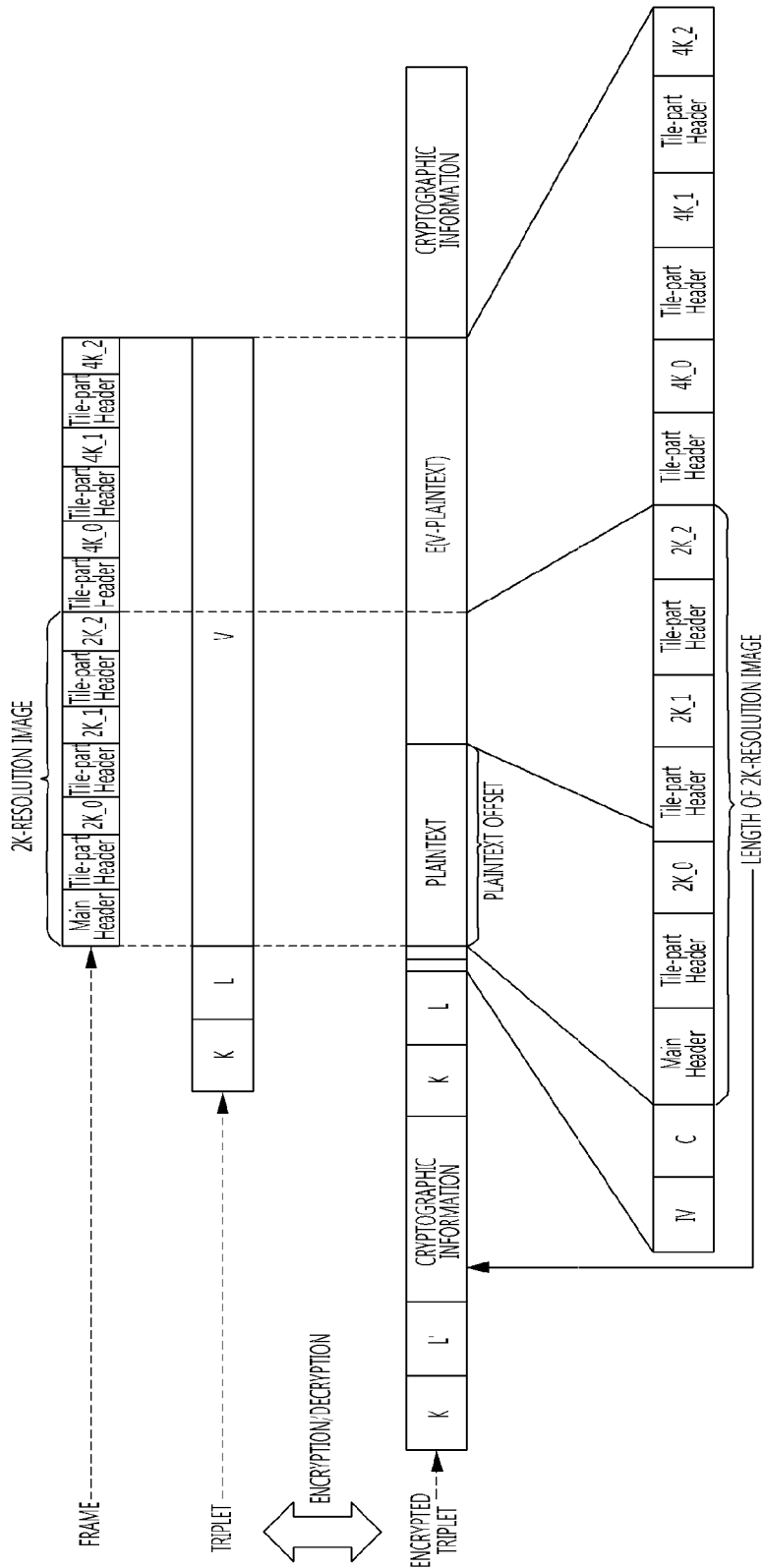
FIG. 1 illustrates a frame structure of digital cinema content according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The terms "encryption" and "decryption" are used herein differently from encoding and decoding, respectively.

Hereinafter, example embodiments of the present invention will be described in detail with reference to the accompanying drawings. Like numbers refer to like elements throughout the description of the drawings, and description of the same element will not be reiterated.

The present invention relates to playing of 2K-resolution data using 4K-resolution digital cinema content compliant with the Digital Cinema Initiatives (DCI) specification in which the 2K-resolution data can be extracted from the 4K-resolution digital cinema content without decrypting all the 4K-resolution data and parsing a Joint Photographic Experts Group (JPEG) 2000 (J2K) frame.

FIG. 1 illustrates a frame structure of digital cinema content according to an example embodiment of the present invention.

Digital cinema compliant with the DCI specification conforms to a standard in which 2K-resolution digital cinema can be screened using 4K-resolution digital cinema content. FIG. 1 shows a structure of a 4K-resolution image packet. One frame consists of a main header, a tile-part header, 2K_0, a tile-part header, 2K_1, a tile-part header, 2K_2, a tile-part header, 4K_0, a tile-part header, 4K_1, a tile-part header, and 4K_2 in sequence. Among these parts, it is possible to play the frame with a resolution of 2K using the main header, the tile-part header, 2K_0, the tile-part header, 2K_1, the tile-part header, and 2K_2.

In the 4K-resolution image packet shown in FIG. 1, one frame has a key-length-value (KLV) triplet structure, and an encrypted triplet has an encrypted triplet structure. The encrypted triplet structure has cryptographic information, and cryptographic information according to an example embodiment of the present invention includes length information about a 2K-resolution image.

To play 4K-resolution digital cinema content with a resolution of 2K according to a conventional method, entire frame data having a resolution of 4K in an encrypted triplet needs to be decrypted, which causes the load of decrypting data of 24 4K-resolution frames having a large size per second. Also, a J2K decoder receiving the decrypted 4K-resolution frames has the load of extracting 2K-resolution data by parsing the 4K-resolution J2K frames up to portions at which 2K-resolution data ends, and causes the load of playing the extracted data with a resolution of 2K.

In this way, the conventional method generates the load of processing 4K-resolution data that is unnecessary for a showing server to show 2K-resolution digital cinema content, and requires a high-performance showing server capable of processing a resolution of 4K.

In other words, even if a showing server has a structure suitable to play 4K-resolution digital cinema content compliant with the DCI specification with a resolution of 2K, a theater requires as many resources as needed to play the digital cinema content with a resolution of 4K in order to play the digital cinema content with a resolution of 2K, resulting in additional cost for the showing server of the theater. Also, it is difficult for an existing showing server supporting a resolution of 2K to stably play 4K-resolution digital cinema content with a resolution of 2K.

Thus, to show 4K-resolution digital cinema content compliant with the DCI specification with a resolution of 2K, only 2K-resolution data among the 4K-resolution digital cinema content needs to be decrypted and extracted without an additional process of decrypting the entire 4K digital cinema content, or extracting 2K-resolution digital cinema content by parsing the 4K digital cinema content.

Example embodiments of the present invention decrypt and play only 2K-resolution data required for showing 4K-resolution digital cinema content with a resolution of 2K, so that the digital cinema content can be screened.

Figure 2:
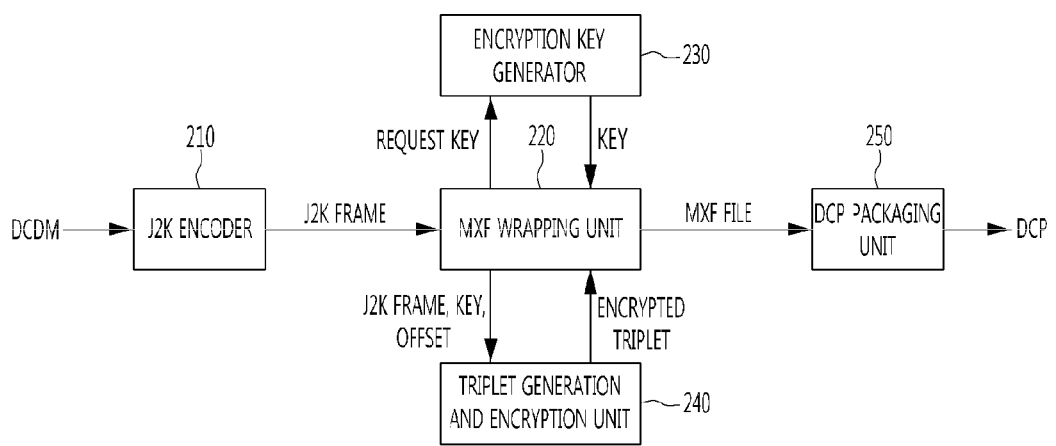
FIG. 2 is a block diagram of a digital content production server according to an example embodiment of the present invention.

FIG. 2 is a block diagram of a digital content production server according to an example embodiment of the present invention.

In general, a movie may be produced and screened through a movie completion step, a master production step, a distribution master production step, a distribution step, and a showing step in brief. Needless to say, more steps are included in practice.

More specifically, when a post-production process of a movie is finished, a digital source master (DSM) is produced as a final result and converted into a digital cinema distribution master (DCDM) to be used for showing a movie. A DSM is a form of a master to be archived or used for another purpose and is not for showing a movie. Rather, a master for showing a movie may be a DCDM.

Compositing is required for conversion into a DCDM, and is slightly differentiated from compositing typically performed in post-production. Compositing mentioned herein is to insert a trailer, advertisement, logo, etc. into a movie or to sequence video and audio to be output for actual screening.

After conversion into the DCDM, a process of converting the DCDM into a digital cinema package (DCP) is required. In the form of the DCP, cinema content is transferred to a movie theater. Transfer to a movie theater means outflow of the content, and thus an encryption and packaging process is required for protecting the content. The DCP is the encrypted and packaged form.

The content production server shown in FIG. 2 according to an aspect of the present invention focuses on generating a DCP from a DCDM.

The content production server shown in FIG. 2 may be an example of an apparatus for generating digital cinema content according to an example embodiment of the present invention.

When a DCDM is input to the production server, a J2K encoder 210 receives the DCDM. The J2K encoder 210 generates a J2K frame by encoding the DCDM and transfers the J2K frame to a material exchange format (MXF) wrapping unit 220.

An encryption key generator 230 generates an encryption key used for encrypting an MXF file and transfers the encryption key to the MXF wrapping unit 220. The MXF wrapping unit 220 receiving the J2K frame and the encryption key transfers information, such as the J2K frame, the key, and a plaintext offset, to a triplet generation and encryption unit 240, and the triplet generation and encryption unit 240 generates an encrypted triplet including length information about 2K-resolution data and outputs the encrypted triplet to the MXF wrapping unit 220.

The MXF wrapping unit 220 receiving the encrypted triplet from the triplet generation and encryption unit 240 generates an MXF file using the encrypted triplet and outputs the MXF file to a DCP packaging unit 250. The DCP packaging unit 250 receiving the MXF file generates a DCP, which is distributed to a showing server.

Figure 3:
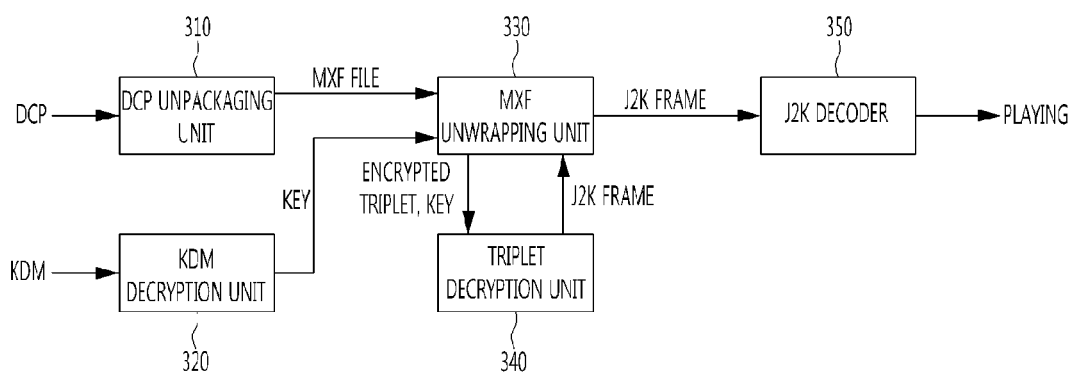
FIG. 3 is a block diagram of a showing server according to an example embodiment of the present invention.

FIG. 3 is a block diagram of a showing server according to an example embodiment of the present invention.

The showing server shown in FIG. 3 may be an example of an apparatus for playing digital cinema content according to an example embodiment of the present invention.

In the showing server, a DCP unpackaging unit 310 parses a DCP and outputs an MXF file to an MXF unwrapping unit 330. A key delivery message (KDM) decryption unit 320 parses a KDM and outputs a decryption key to the MXF unwrapping unit 330.

The MXF unwrapping unit 330 extracts an encrypted triplet and key to be decrypted from the MXF file. The MXF unwrapping unit 330 transfers the encrypted triplet and key to a triplet decryption unit 340. The triplet decryption unit 340 extracts length information about a 2K-resolution image and plaintext offset information from the encrypted triplet and key, decrypts the amount of data required to constitute 2K-resolution digital cinema content, and transfers a 2K-resolution J2K frame to the MXF unwrapping unit 330.

The MXF unwrapping unit 330 outputs the received 2K-resolution J2K frame to a J2K decoder 350, and then the J2K frame decoded by the J2K decoder 350 is played.

As described with reference to the example embodiment of the FIG. 3, the present invention decrypts and decodes only data required to be screened with a resolution of 2K using digital cinema content having a resolution of 4K, thereby playing the digital cinema content for screening.

Figure 4:
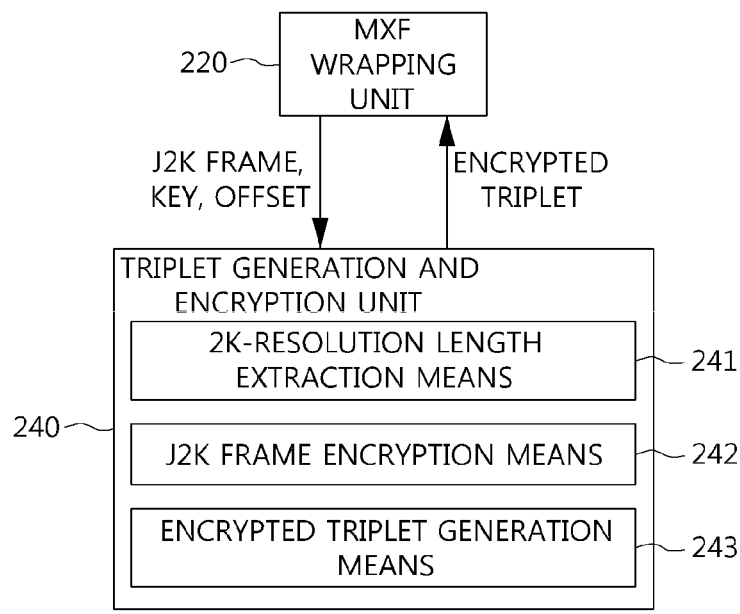
FIG. 4 is a detailed block diagram of a triplet generation and encryption unit according to an example embodiment of the present invention.

FIG. 4 is a detailed block diagram of a triplet generation and encryption unit according to an example embodiment of the present invention.

A triplet generation and encryption unit 240 according to an example embodiment of the present invention includes a 2K-resolution length extraction means 241 that extracts length information about a 2K-resolution data portion from a 4K-resolution J2K frame received from an MXF wrapping unit 220, a J2K frame encryption means 242 that encrypts a J2K frame using the J2K frame, a key, and plaintext offset information, and an encrypted triplet generation means 243 that inserts the length information about the 2K-resolution data into cryptographic information using the length information about the 2K-resolution data, the encrypted J2K frame, the plaintext offset information, etc., and generates an encrypted triplet.

Triplet generation and encryption of the triplet generation and encryption unit 240 will be described in further detail below.

The 2K-resolution length extraction means 241 receives a 4K-resolution J2K frame received from the MXF wrapping unit 220. As shown in FIG. 1, the 4K-resolution J2K frame has a structure in which a main header, a tile-part header, 2K_0, a tile-part header, 2K_1, a tile-part header, 2K_2, a tile-part header, 4K_0, a tile-part header, 4K_1, a tile-part header, and 4K_2 are sequenced.

From this 4K-resolution J2K frame structure, the 2K-resolution length extraction means 241 extracts length of a 2K-resolution data portion including the tile-part header, 2K_0, the tile-part header, 2K_1, the tile-part header, and 2K_2.

The J2K frame encryption means 242 encrypts a J2K frame using the J2K frame, a key, and plaintext offset information. The encrypted triplet generation means 243 generates an encrypted triplet using the length information about the 2K-resolution data, the encrypted J2K frame, the plaintext offset information, etc. At this time, the length information about the 2K-resolution data is inserted into cryptographic information according to an example embodiment of the present invention.

Figure 5:
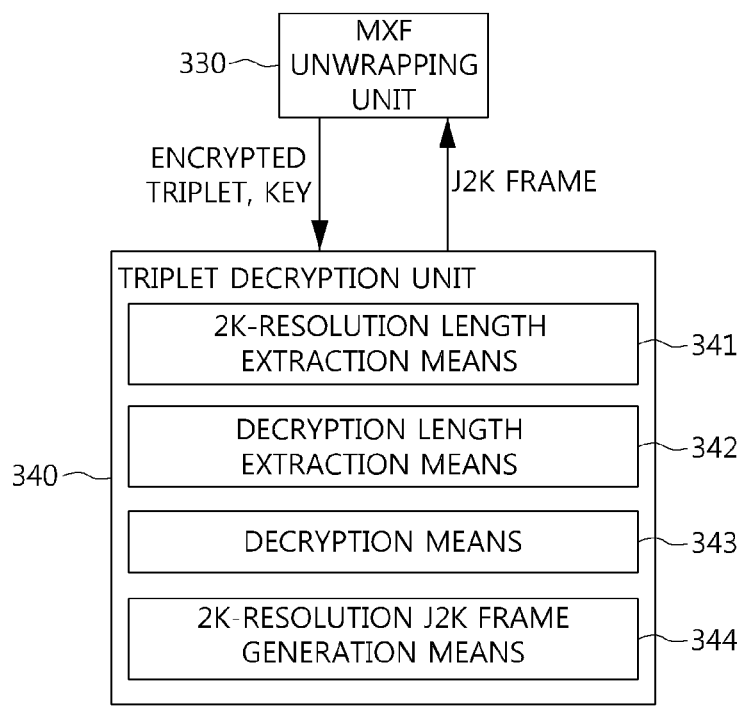
FIG. 5 is a detailed block diagram of a triplet decryption unit according to an example embodiment of the present invention.

FIG. 5 is a detailed block diagram of a triplet decryption unit according to an example embodiment of the present invention.

As illustrated in FIG. 3, the triplet decryption unit 340 receives an encrypted triplet from the MXF unwrapping unit 330.

The triplet decryption unit 340 includes a 2K-resolution data length extraction means 341 that extracts length information about 2K-resolution data from the encrypted triplet, a decryption length extraction means 342 that extracts a plaintext offset from the encrypted triplet and calculates an amount of decryption data by comparing the extracted plaintext offset with the 2K-resolution data length, a decryption means 343 that decrypts the encrypted triplet according to the decryption amount using a key, and a 2K-resolution J2K frame generation means 344 that generates 2K-resolution data using plaintext and decrypted data.

When triplet decryption begins, the 2K-resolution data length extraction means 341 extracts length information about 2K-resolution data inserted into cryptographic information in an encrypted triplet received from the MXF unwrapping unit 330.

The decryption length extraction means 342 extracts a plaintext offset from the encrypted triplet, and calculates the amount of data to be decrypted by comparing the extracted plaintext offset with the 2K-resolution data length extracted by the 2K-resolution data length extraction means 341.

The decryption means 343 decrypts the encrypted triplet according to a decryption length using a key. The 2K-resolution J2K frame generation means 344 generates 2K-resolution data using the plaintext and decrypted data Using the configurations according to example embodiments of the present invention described with reference to FIGS. 4 and 5, the triplet generation and encryption unit 240 generates an encrypted triplet including 2K-resolution data length information, and the triplet decryption unit 340 extracts 2K-resolution length information and plaintext offset information, decrypts the amount of data required to constitute 2K-resolution digital cinema content, and generates a J2K frame having a resolution of 2K, so that digital cinema content having a resolution of 4K can be played with a resolution of 2K.

Figure 6:
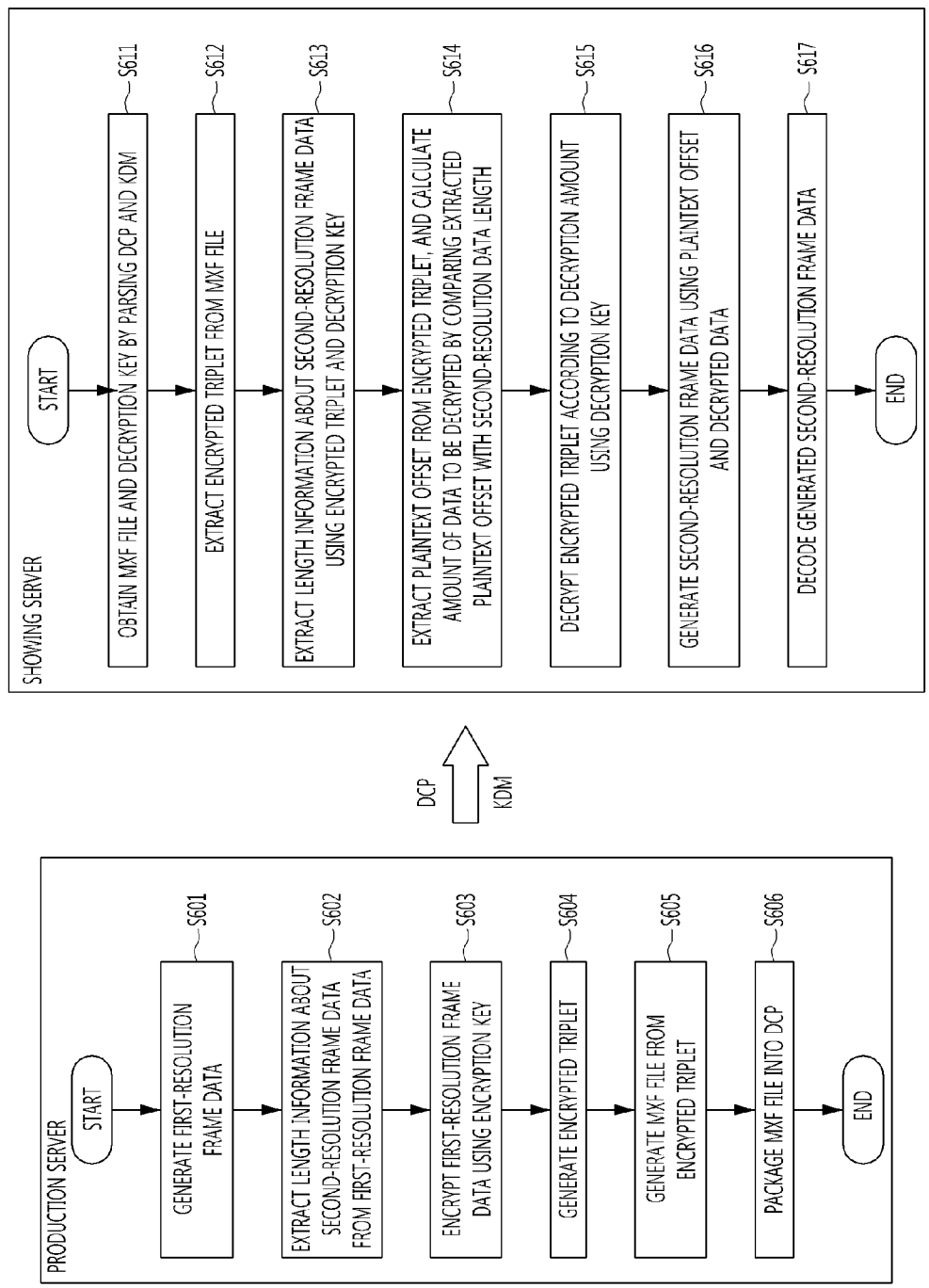
FIG. 6 is a flowchart illustrating a method of generating and playing digital content according to an example embodiment of the present invention.

FIG. 6 is a flowchart illustrating a method of generating and playing digital content according to an example embodiment of the present invention.

In FIG. 6, operation of a production server and a showing server is separately illustrated.

In FIG. 6, an example embodiment of frame data having a first resolution is J2K frame data having a resolution of 4K, and an example embodiment of frame data having a second resolution is J2K frame data having a resolution of 2K.

First, the production server generates first-resolution frame data (S601), and extracts length information about second-resolution frame data from the first-resolution frame data (S602). Also, the production server encrypts the first-resolution frame data using an encryption key (S603). Then, the production server generates an encrypted triplet (S604). At this time, the length information about the second-resolution frame data is inserted into cryptographic information in the encrypted triplet. Subsequently, an MXF file is generated from the encrypted triplet (S605), and packaged into a DCP (S606).

The DCP is generally transferred to a movie theater, etc. together with a KDM, and a showing server shows digital cinema content using the DCP and KDM.

Specifically, the showing server obtains the MXF file and a decryption key by parsing the DCP and the KDM (S611), and extracts the encrypted triplet from the MXF file (S612).

Then, the showing server extracts the length information about the second-resolution frame data using the encrypted triplet and the decryption key (S613). Subsequently, the showing server extracts a plaintext offset from the encrypted triplet, and calculates an amount of data to be decrypted by comparing the extracted plaintext offset with the second-resolution data length (S614). Also, the showing server decrypts the encrypted triplet according to the decryption amount using the decryption key (S615), and generates second-resolution frame data using the plaintext offset and the decrypted data (S616). The generated second-resolution frame data is decoded (S617) and finally screened.

Example embodiments of the present invention extract only 2K-resolution data from digital cinema content having a resolution of 4K and decrypt and play the 2K-resolution data without decrypting all the 4K-resolution data and parsing a J2K frame, so that the 4K-resolution digital cinema content can be screened with a resolution of 2K. Thus, in comparison with conventional art, a load of a showing server is significantly reduced.

While the example embodiments of the present invention and their advantages have been described in detail, it should be understood that various changes, substitutions and alterations may be made herein without departing from the scope of the invention.

What is claimed is:

1. A method of playing digital cinema content using a digital cinema package (DCP) including frame data having a first resolution and length information about frame data having a second resolution lower than the first resolution, and a key delivery message (KDM), the method including:
    obtaining a material exchange format (MXF) file and a decryption key by parsing the DCP and the KDM;
    extracting an encrypted triplet from the MXF file;
    extracting the length information about the second-resolution frame data using the encrypted triplet and the decryption key;
    decrypting an amount of data required to decrypt the second-resolution frame data in the first-resolution frame data using the length information about the second-resolution frame data; and
    decoding the decrypted second-resolution frame data.

2. The method of claim 1, wherein the length information about the second-resolution frame data is inserted into cryptographic information in the encrypted triplet.

3. The method of claim 1, wherein the first-resolution frame data is 4K-resolution Joint Photographic Experts Group (JPEG) 2000 (J2K) frame data, and the second-resolution frame data is 2K-resolution J2K frame data.

4. An apparatus for playing digital cinema content using a digital cinema package (DCP) including frame data having a first resolution and length information about frame data having a second resolution lower than the first resolution, and a key delivery message (KDM), the apparatus comprising:
    an unpackaging unit configured to obtain a material exchange format (MXF) file by parsing the DCP;
    a KDM decryption unit configured to obtain a decryption key by parsing the KDM;
    an MXF unwrapping unit configured to extract an encrypted triplet from the MXF file; and
    a triplet decryption unit configured to extract the length information about the second-resolution frame data using the encrypted triplet and the decryption key, and decrypting an amount of data required to decrypt the second-resolution frame data in the first-resolution frame data using the length information about the second-resolution frame data.

5. The apparatus of claim 4, wherein the triplet decryption unit includes:
    a second-resolution data length extraction means configured to extract the length information about the second-resolution frame data from the encrypted triplet;
    a decryption length extraction means configured to extract a plaintext offset from the encrypted triplet, and calculate an amount of the data to be decrypted by comparing the extracted plaintext offset with the second-resolution data length; and
    a decryption means configured to decrypt the encrypted triplet according to the calculated decryption amount using the decryption key.

6. The apparatus of claim 5, wherein the triplet decryption unit further includes a second frame generation means configured to generate the second-resolution data using the plaintext offset and the decrypted data.

7. The apparatus of claim 4, further comprising a decoder configured to decode the decrypted second-resolution frame data.

8. The apparatus of claim 4, wherein the first-resolution frame data is 4K-resolution Joint Photographic Experts Group (JPEG) 2000 (J2K) frame data, and the second-resolution frame data is 2K-resolution J2K frame data.

* * * * *